United States Patent [19]

Davis

[11] Patent Number: 4,726,798

[45] Date of Patent: Feb. 23, 1988

[54] IGNITION INTERRUPT SYSTEM WITH STALL INTERVAL

[75] Inventor: James A. Davis, Ripon, Wis.

[73] Assignee: Brunswick Corporation, Skokie, Ill.

[21] Appl. No.: 31,991

[22] Filed: Mar. 27, 1987

[51] Int. Cl.$^4$ .......................................... B63H 23/00
[52] U.S. Cl. ...................................... 440/75; 74/851; 74/852; 123/335; 440/86
[58] Field of Search .............. 440/75, 86, 1; 74/851, 74/852; 123/334, 335, 630, 417; 192/0.062, 0.084, 0.096

[56] References Cited

U.S. PATENT DOCUMENTS

| | | | |
|---|---|---|---|
| 3,919,510 | 11/1975 | Barnes | 200/61.88 |
| 4,231,316 | 11/1980 | Bland et al. | 440/86 |
| 4,262,622 | 4/1981 | Dretzka et al. | 440/1 |
| 4,403,970 | 9/1983 | Dretzka et al. | 440/75 |

Primary Examiner—Sherman D. Basinger
Attorney, Agent, or Firm—Andrus, Sceales, Starke & Sawall

[57] ABSTRACT

A spark ignition interrupt system (24) is provided for a marine propulsion internal combustion engine (6) to reduce engine speed and facilitate shifting of a marine propulsion transmission (13). Spark ignition is terminated in response to a given shift condition until engine speed drops below a given cut-in speed or until completion of the shifting, whichever occurs first. A stall interval is also started in response to the given shift condition. The engine is stalled upon completion of the stall interval if the shifting is not complete, even if engine speed has dropped below the given cut-in speed.

13 Claims, 5 Drawing Figures

IGNITION INTERRUPT SYSTEM WITH STALL INTERVAL

BACKGROUND AND SUMMARY

The invention relates to system for interrupting spark ignition of a marine propulsion internal combustion engine to reduce engine speed and facilitate shifting of a marine propulsion transmission.

Various systems are known in the prior art for interrupting spark ignition to reduce engine speed during shifting to ensure positive engagement for reversing propeller rotation. Resistance to shifting is typically sensed because this indicates improper transmission engagement. It is known to provide a single ignition interruption for a specified length of time, or to interrupt ignition periodically through a definite timing sequence, or to provide a variable sequence according to engine operating characteristic variables. The periodic interruption may be provided by a first timer, and the overall length of the sequence may be determined by a second timer establishing an overall cycle. It is also known to sense engine rpm and establish ignition-off as long as the rpm is above a set point, and ignition-on as long as the rpm is below this set point. This prevents the engine from dying by restoring ignition when the rpm falls below the set point.

In the present invention, a stall interval is provided and the engine is intentionally stalled upon completion of such interval if the shifting is not completed, even if engine speed has dropped below a given cut-in speed.

DETAILED DESCRIPTION

Figure 1:
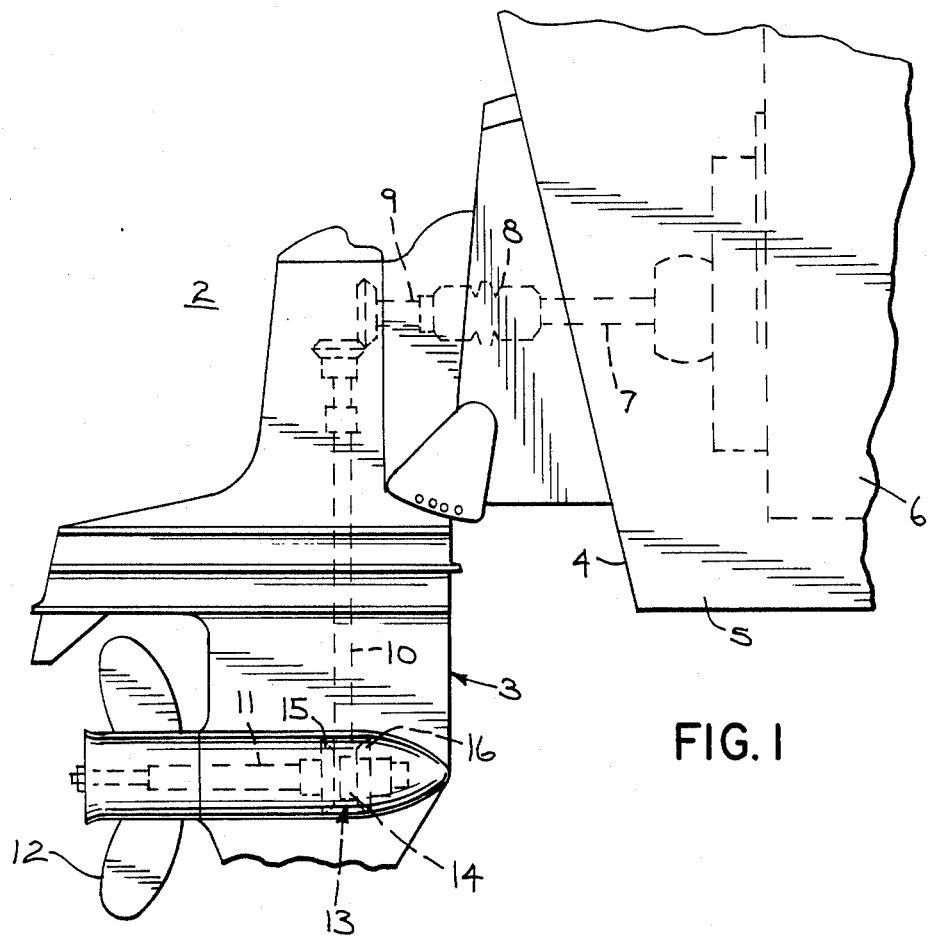
FIG. 1 is a partial view of a marine propulsion system.

FIG. 1 shows a marine propulsion system 2 including a stern drive 3 mounted to transom 4 of boat 5 having an inboard internal combustion engine 6. Output shaft 7 from engine 6 is connected through universal joint 8 to shaft 9 which drives vertical shaft 10 which in turn drives propeller shaft 11 to rotate propeller 12. Vertical shaft 10 is coupled to propeller shaft 11 by a transmission 13 including a dog clutch 14 axially slideable along propeller shaft 11 between counter rotating gears 15 and 16 providing forward and reverse, all as is well known.

Figure 2:
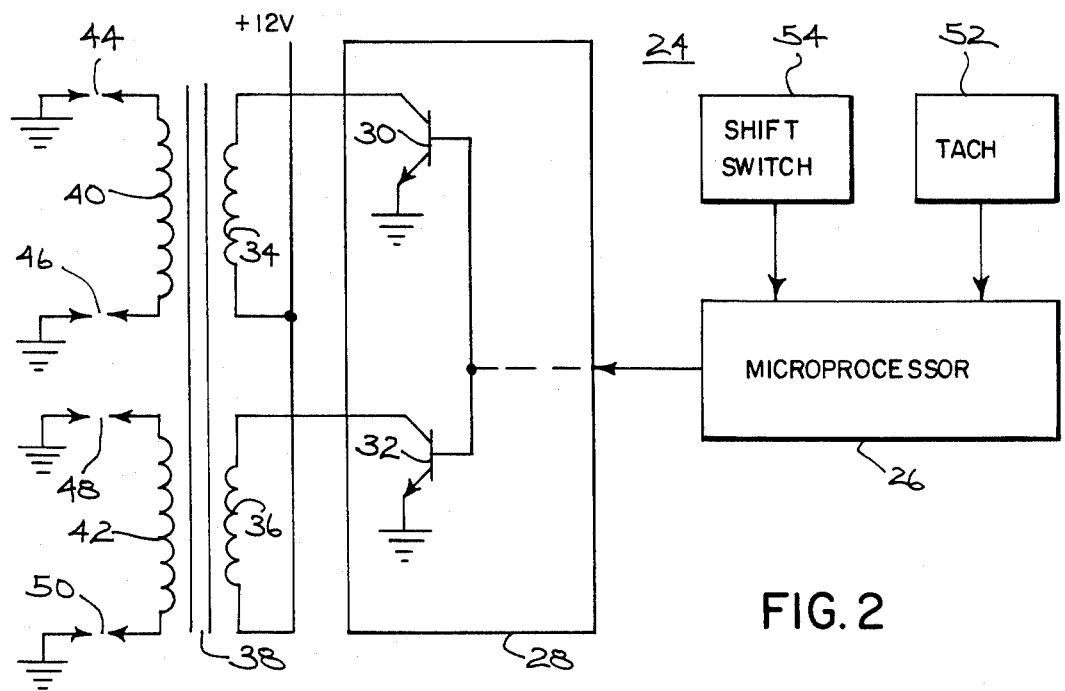
FIG. 2 is a schematic circuit diagram illustrating an ignition interrupt system in accordance with the invention.

FIG. 2 shows an ignition interrupt system 24 for interrupting the spark ignition of internal combustion engine 6 to reduce engine speed and facilitate shifting of transmission 13. System 24 includes a microprocessor 26 controlling an ignition trigger circuit 28 including bipolar NPN transistors 30 and 32 providing ignition pulses for primary windings 34 and 36 of coil 38. The coil has secondary windings 40 and 42 supplying high voltage to spark plugs 44, 46, 48 and 50 for spark ignition of engine 6. Windings 34 and 36 are connected to a 12 volt supply, typically the boat battery. When transistor 30 is on, current flows from the 12 volt battery through the primary winding 34 and through transistor 30. As is conventional, when transistor 30 turns off, the interruption of current flow through primary winding 34 induces a pulse in secondary winding 40 which in turn provides the ignition pulse providing spark ignition. The operation of remaining transistors or other switches such as 32 and other primary and secondary windings such as 36 and 42 is comparable.

Engine speed is sensed by tachometer 52 and input to microprocessor 26. Transmission shifting is sensed by shift switch 54 and input to microprocessor 26. Shift switch 54 senses a given shift condition indicating initiation of a given transmission shifting operation, and senses completion of such shifting. In preferred form, switch 54 is a Mercury Marine Part No. 13051A3 shift switch assembly which senses resistance to shifting. The switch closes upon initial sensing of a given shift resistance, and opens upon elimination of such resistance at the completion of the shift. Microprocessor 26 is a Motorola 6801.

Figure 3:
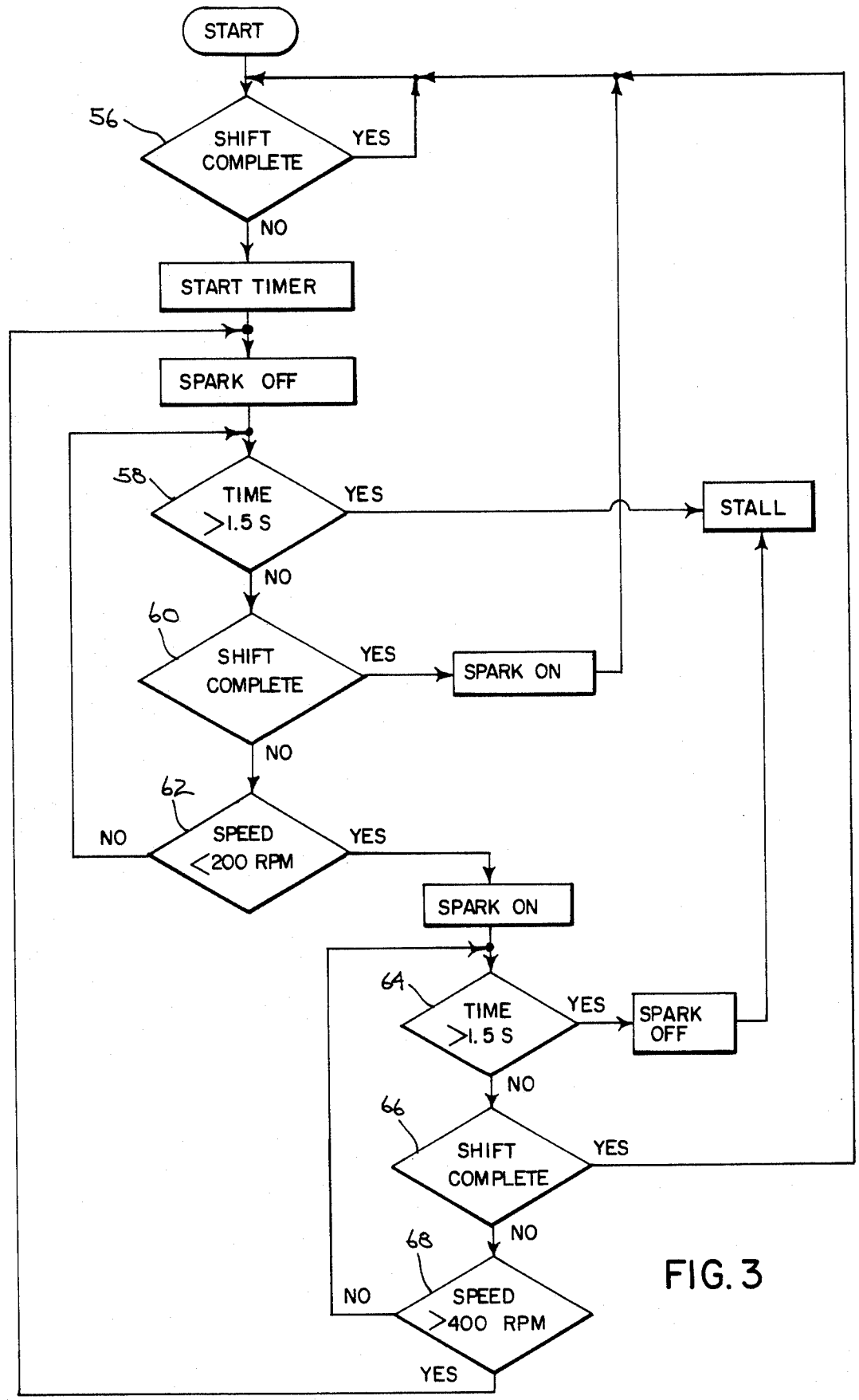
FIG. 3 is a flow diagram showing the program for the microprocessor of FIG. 2.

FIG. 3 shows the program for operating microprocessor 26. Spark ignition is terminated in response to given shift resistance until engine speed drops below a given cut-in speed or until completion of the shifting, whichever occurs first. A stall interval is also started in response to the given shift resistance. The engine is stalled upon completion of the stall interval if shifting is not completed, even if engine speed has dropped below the given cut-in speed. The engine is stalled by terminating the trigger pulses from microprocessor 26 to transistors 30 and 32 in ignition trigger circuit 28.

The first step at 56 is to ascertain whether the shifting is completed. If the shift switch is closed, then the shift is not complete. If the shift switch is open, then the shift is complete. If the shift is complete, then step 56 is repeated. If the shift is not complete, then a stall interval is started by starting an internal timer within the microprocessor, and spark ignition is terminated by terminating the trigger pulses from microprocessor 26 to transistors 30 and 32, and the program proceeds to step 58. It is then ascertained whether the stall interval has elapsed. In the preferred embodiment, the stall interval is about 1.5 seconds, as this corresponds to a reasonable time for completing a shift, though other intervals can of course be chosen. If the stall interval has elapsed, then the engine is stalled by continuing the termination of trigger pulses from microprocessor 26 to transistors 30 and 32. If the stall interval has not elasped, then the program proceeds to step 60. It is then again ascertained whether the shifting is completed. If the shifting is completed, spark ignition is restored by restoring the trigger pulses from microprocessor 26 to transistors 30 and 32, and the program proceeds to step 56. If the shifting is not completed, the program proceeds to step 62 and ascertains whether engine speed is below a given cut-in speed, which in the preferred embodiment is chosen around 200 rpm. If engine speed is not below the cut-in speed, the program proceeds to step 58, where it is again ascertained whether the stall interval has elapsed, and if not, whether the shift has been complete, and if not, again ascertained whether the speed is below cut-in speed. If engine speed stays above cut-in speed, the program will continue the loop through steps 58, 60 and 62 until either the stall interval elapses or the shift is complete.

If engine speed is below the 200 rpm cut-in speed, spark ignition is restored and the program proceeds to step 64. It is then again ascertained whether the stall interval has elapsed, and if so, spark ignition is terminated and the engine is stalled. If the stall interval has not elapsed, the program proceeds to step 66 and it is ascertained whether the shifting is completed. If the shifting is completed, the program proceeds to step 56. If the shifting is not completed, the program proceeds to step 68 and it is ascertained whether engine speed is above a given cut-out speed, preferably chosen to be about 400 rpm. If engine speed is above the 400 rpm cut-out speed, the program proceeds to step 58. If engine speed is not above the 400 rpm cut-out speed, the program proceeds to step 64. When engine speed rises above 400 rpm, spark ignition is terminated until engine speed drops below 200 rpm, at which time spark ignition is restored until engine speed rises above 400 rpm, etc. However, the engine is not allowed to continue indefinitely oscillating between these speeds or running at an intermediate speed, because the engine will be stalled after 1.5 seconds, regardless of engine speed. The stall condition at the output of steps 58 and 64 is maintained until the engine is restarted.

Figure 4:
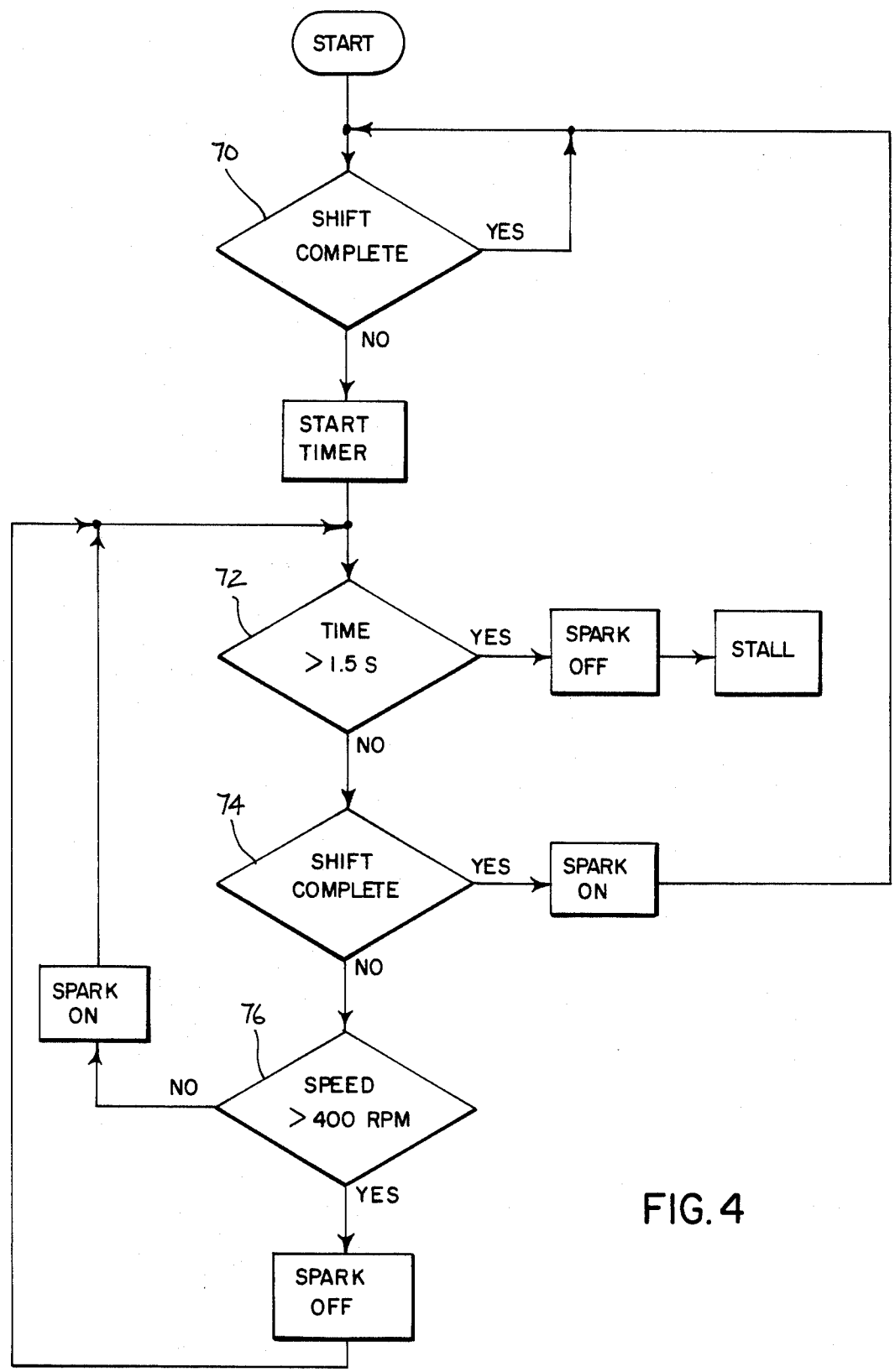
FIG. 4 is a flow diagram showing another program for the microprocessor of FIG. 2.

FIG. 4 shows another spark ignition interrupt program. It is ascertained at step 70 whether the shift is complete, and if so the program repeats step 70. If shifting is not complete, the stall interval is started by starting the internal timer in the microprocessor, and the program proceeds to step 72. If the stall interval has elapsed, then spark ignition is terminated and the engine is stalled. If the stall interval has not elapsed, the program proceeds to step 74, and it is again ascertained whether shifting is complete. If shifting is complete, spark ignition is provided, i.e. remains ON if already ON, and is restored if OFF, and the program returns to step 70. If the shifting is not complete, the program proceeds to step 76, and it is ascertained whether engine speed is above a given speed, here chosen to be 400 rpm. If engine speed is not above 400 rpm, spark ignition is provided, i.e. remains ON if already ON, and is restored if OFF, and the program proceeds to step 72. If engine speed is above 400 rpm, spark ignition is terminated and the program proceeds to step 72. The stall condition at the output of step 72 remains until the engine is restarted.

In FIG. 4, the engine cut-in speed is equal to the engine cut-out speed, and there is no hysteresis as in FIG. 3. Because of the differing shift loads resulting from various combinations of propeller and engine flywheel inertias, it may be desirable to provide hysteresis for some installations.

Figure 5:
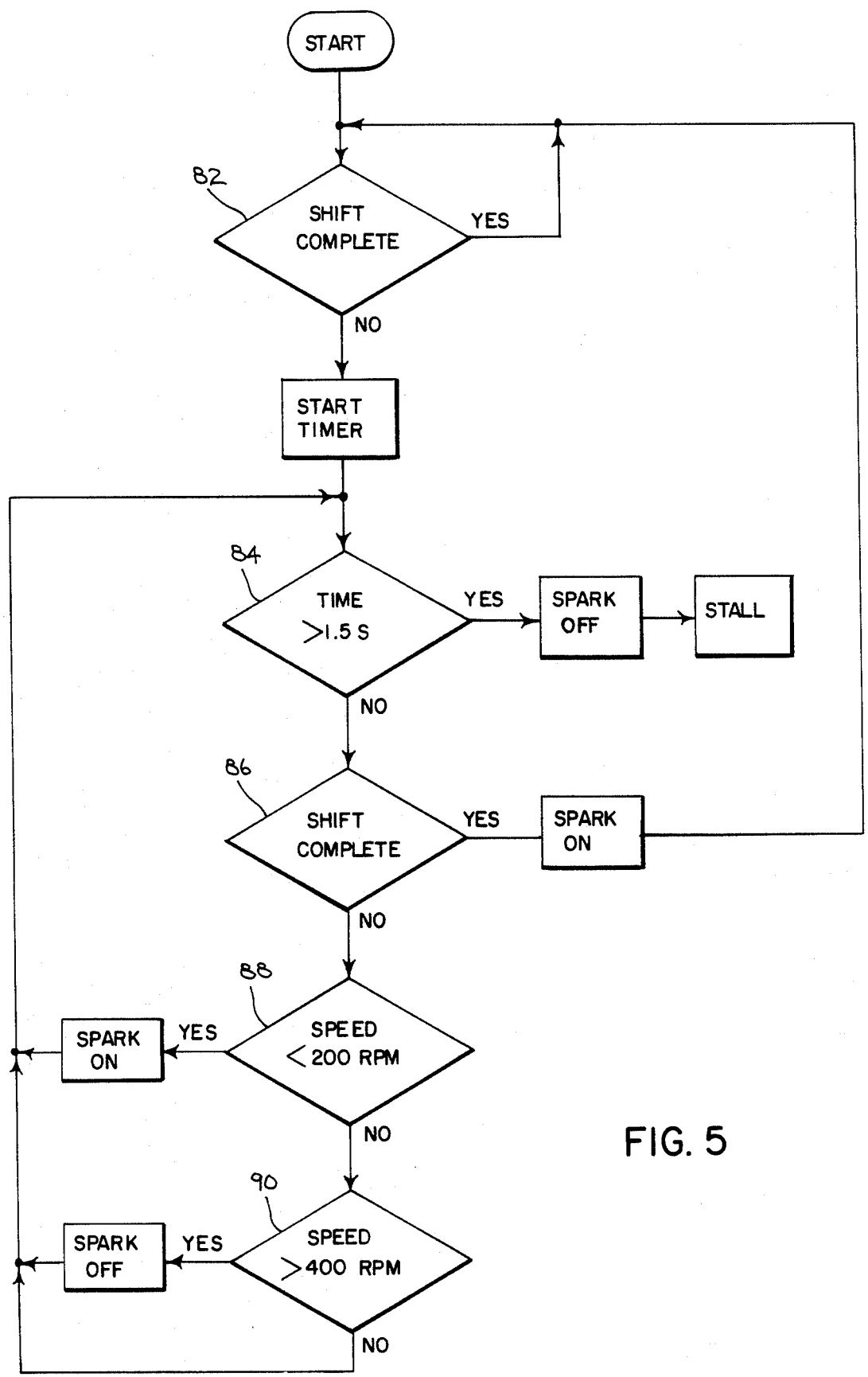
FIG. 5 is a flow diagram showing another program for the microprocessor of FIG. 2.

FIG. 5 shows another ignition interrupt program. It is ascertained at step 82 whether shifting is complete, and if so the program repeats step 82. If shifting is not complete, the stall interval is started by starting an internal timer in the microprocessor and proceeding to step 84 where it is ascertained whether the stall interval has elapsed. If the stall interval has elapsed, spark ignition is terminated and the engine is stalled. If the stall interval has not elapsed, the program proceeds to step 86 and it is again ascertained whether the shifting is complete. If the shifting is complete, spark ignition is provided, i.e. remains ON if already ON, and is restored if OFF, and the program returns to step 82. If the shifting is not complete, the program proceeds to step 88, and it is ascertained whether engine speed is below a given cut-in speed, e.g. 200 rpm. If engine speed is below the 200 rpm cut-in speed, spark ignition is provided, i.e. remains ON if already ON, and is restored if OFF, and the program proceeds to step 84. If engine speed is not below the 200 rpm cut-in speed, the program proceeds to step 90, and it is determined whether engine speed is above a cut-out speed, e.g. 400 rpm. If engine speed is above the 400 rpm cut-out speed, spark ignition is terminated and the program proceeds to step 84. If engine speed is not above the 400 rpm cut-out speed, the program proceeds to step 84. The program repeats the loop through steps 84, 86, 88 and 90 until the stall interval elapses or the shift is complete. When engine speed drops below 200 rpm, spark ignition is provided, and when engine speed rises above 400 rpm spark ignition is terminated. If engine speed is between 200 and 400 rpm, then the state of spark ignition, either ON or OFF, remains unchanged. If the spark ignition is ON, then the engine speed will increase until it reaches 400 rpm, at which time spark ignition will be terminated. On the other hand, if engine speed is between 200 and 400 rpm and the spark ignition is OFF, then engine speed will decrease until it reaches 200 rpm, at which time spark ignition will be turned back ON. The stall condition at the output of step 84 remains until the engine is restarted.

It is recognized that various equivalents, alternatives and modifications are possible within the scope of the appended claims.

I claim:

1. A method for interrupting spark ignition of a marine propulsion internal combustion engine to reduce engine speed and facilitate shifting of a marine propulsion transmission, comprising:
   sensing engine speed;
   sensing a given shift condition indicating initiation of a given transmission shifting operation, and sensing completion of said shifting;
   terminating said spark ignition in response to said given shift condition until said engine speed drops below a given cut-in speed or until said completion of said shifting, whichever occurs first;
   starting a stall interval in response to said given shift condition;
   stalling said engine upon completion of said stall interval if said shifting is not complete, even if said engine speed has dropped below said given cut-in speed.

2. The invention according to claim 1 comprising stalling said engine by terminating said spark ignition.

3. The invention according to claim 2 comprising:
   (a) if said engine speed has not dropped below said given cut-in speed before completion of said stall interval, then stalling said engine by continuing termination of said spark ignition;
   (b) if said engine speed has dropped below said given cut-in speed before completion of said stall interval and said spark ignition has been restored, then stalling said engine by re-terminating said spark ignition.

4. The invention according to claim 3 comprising:
   restoring said spark ignition before completion of said stall interval if said engine speed drops below said given cut-in speed;
   terminating said spark ignition before completion of said stall interval if said engine speed rises above a given cut-out speed.

5. The invention according to claim 4 wherein said cut-in speed is less than said cut-out speed.

6. The invention according to claim 4 wherein said cut-in speed equals said cut-out speed.

7. A method for interrupting spark ignition of a marine propulsion internal combustion engine to reduce engine speed and facilitate shifting of a marine propulsion transmission, including the steps of sensing engine speed, sensing a given shift condition indicating initiation of a given transmission shifting operation, and sensing completion of said shifting, and comprising the following steps in combination:
(a) ascertaining whether said shifting is complete,
and if so, repeating step (a),
and if not, starting a stall interval, terminating said spark ignition, and proceeding to step (b);
(b) ascertaining whether said stall interval has elapsed,
and if so, stalling said engine,
and if not, proceeding to step (c);
(c) ascertaining whether said shifting is complete,
and if so, restoring said spark ignition and proceeding to step (a),
and if not, proceeding to step (d);
(d) ascertaining whether said engine speed is below a given cut-in speed,
and if not, proceeding to step (b),
and if so, restoring said spark ignition and proceeding to step (e);
(e) ascertaining whether said stall interval has elapsed,
and if so, terminating said spark ignition and stalling said engine,
and if not, proceeding to step (f);
(f) ascertaining whether said shifting is complete,
and if so, proceeding to step (a),
and if not, proceeding to step (g);
(g) ascertaining whether said engine speed is above a given cut-out speed,
and if so, terminating said spark ignition and proceeding to step (b),
and if not, proceeding to step (e).

8. A method for interrupting spark ignition of a marine propulsion internal combustion engine to reduce engine speed and facilitate shifting of a marine propulsion transmission, including the steps of sensing engine speed, sensing a given shift condition indicating initiation of a given transmission shifting operation, and sensing completion of said shifting, and comprising the following steps in combination:
(a) ascertaining whether said shifting is complete,
and if so, repeating step (a),
and if not, starting a stall interval and proceeding to step (b);
(b) ascertaining whether said stall interval has elapsed,
and if so, terminating said spark ignition and stalling said engine,
and if not, proceeding to step (c);
(c) ascertaining whether said shifting is complete,
and if so, providing said spark ignition and proceeding to step (a),
and if not, proceeding to step (d);
(d) ascertaining whether said engine speed is above a given speed,
and if not, providing said spark ignition and proceeding to step (b),
and if so, terminating said spark ignition and proceeding to step (b).

9. A method for interrupting spark ignition of a marine propulsion internal combustion engine to reduce engine speed and facilitate shifting of a marine propulsion transmission, including the steps of sensing said engine speed, sensing a given shift condition indicating initiation of a given transmission shifting operation, and sensing completion of said shifting, and comprising the following steps in combination:
(a) ascertaining whether said shifting is complete,
and if so, repeating step (a),
and if not, starting a stall interval and proceeding to step (b);
(b) ascertaining whether said stall interval has elapsed,
and if so, terminating said spark ignition and stalling said engine,
and if not, proceeding to step (c);
(c) ascertaining whether said shifting is complete,
and if so, providing said spark ignition and proceeding to step (a),
and if not, proceeding to step (d);
(d) ascertaining whether said engine speed is below a given cut-in speed,
and if so, providing said spark ignition and proceeding to step (b),
and if not, proceeding to step (e);
(e) ascertaining whether said engine speed is above a given cut-out speed,
and if so, terminating said spark ignition and proceeding to step (b),
and if not, proceeding to step (b).

10. A system for spark ignition interruption of a marine propulsion internal combustion engine to reduce engine speed and facilitate shifting a marine propulsion transmission, comprising means sensing engine speed means sensing a given shift condition indicating initiation of a given transmission shifting operation and sensing completion of said shifting, and means terminating said spark ignition in response to said given shift condition until said engine speed drops below a given cut-in speed or until said completion of said shifting, whichever occurs first, and starting a stall interval in response to said given shift condition, and stalling said engine upon completion of said stall interval if said shifting is not complete, even if said engine speed has dropped below said given cut-in speed.

11. The invention according to claim 10 wherein said last mentioned means comprises programmed microprocessor means and ignition control circuit means.

12. The invention according to claim 11 wherein said engine is stalled by terminating said spark ignition.

13. The invention according to claim 12 wherein:
said engine is stalled by continuing termination of said spark ignition if said engine has not dropped to said given cut-in speed before completion of said stall interval;
said engine is stalled by re-terminating said spark ignition if said engine speed has dropped below said given cut-in speed before completion of said stall interval and said spark ignition has been restored.

* * * * *